March 20, 1956  L. H. BUZZINI  2,738,608
COMBINATION GAFF AND FISH NET
Filed Aug. 19, 1954
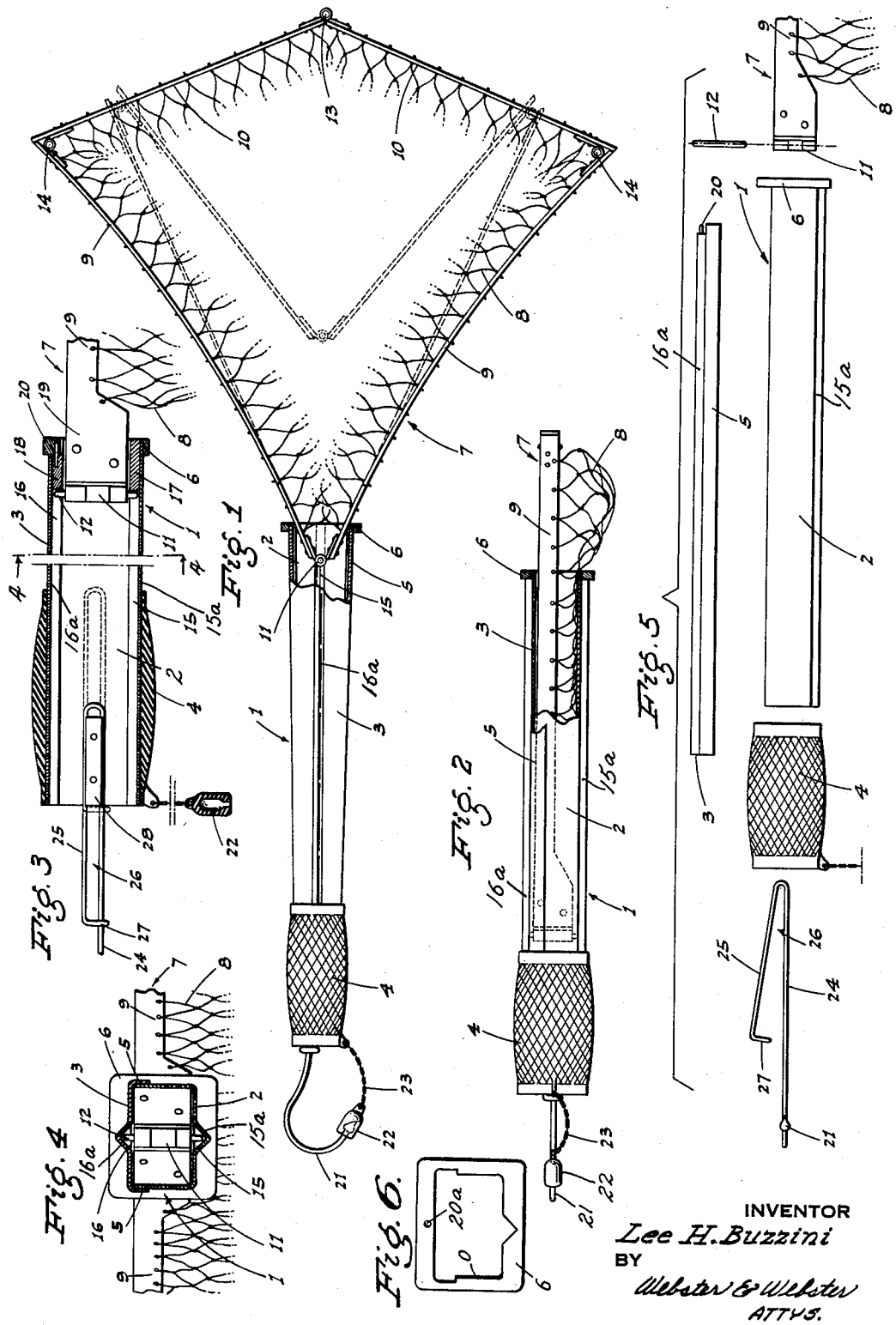
INVENTOR
Lee H. Buzzini
BY
Webster & Webster
ATTYS.

United States Patent Office 2,738,608
Patented Mar. 20, 1956

2,738,608

COMBINATION GAFF AND FISH NET

Lee H. Buzzini, Yosemite National Park, Calif.

Application August 19, 1954, Serial No. 450,878

4 Claims. (Cl. 43—12)

This invention relates to fishermen's equipment, and particularly to a combination fish net and gaff unit.

An object of the invention is to provide a unit for the purpose which includes an elongated handle from which the net projects when in use, and which net and handle are arranged so that the net can be readily folded and inserted into the handle from one end therof for transportation purposes, or when the gaff—which is at the other end of the handle—is to be used. Also, the net may be easily and quickly drawn out to an operative position from its folded and concealed position within the handle.

A further object is to so mount the net in connection with the handle that the net can be easily separated from any connection with the handle when repair of the net or of the handle is necessary. Also, if the handle should be damaged and temporarily unusable, the net may be withdrawn and used separately.

Another object is to mount the gaff in connection with the handle so that when not in use it may be retracted into the handle somewhat without interfering with the net when folded, and also said gaff may be readily removed from connection with the handle if necessary.

A further object is to provide a unit for the purpose in which the various parts may be assembled with, or disassembled from, connection with each other without the need of screws or other members which require the use of a tool.

Still another object of the invention is to provide a combination gaff and fish net which is designed for ease and economy of manufacture.

It is also an object of the invention to provide a practical and reliable combination gaff and fish net, and one which will be effective for the purpose for which it is designed.

These objects are accomplished by means of such structure and relative arrangement of parts as will fully appear by a perusal of the following specification and claims.

In the drawings:

Fig. 1 is a plan view of the unit, with the net extended from the handle and opened out, and with the handle partly broken away and in section.

Fig. 2 is a side elevation of the unit showing the net folded and partially telescoped into the handle; the latter being partly broken away and in section.

Fig. 3 is a fragmentary enlarged longitudinal elevation of the unit, showing the net and gaff both extended.

Fig. 4 is a cross section on line 4—4 of Fig. 3.

Fig. 5 is an exploded elevation of the device, showing the various parts thereof separated from each other.

Fig. 6 is an end view of the handle collar, detached.

Referring now more particularly to the drawings and to the characters of reference marked thereon, the combination fish and gaff unit comprises an elongated, tubular, open-ended handle, indicated generally at 1, and which is of generally rectangular form in section, as shown in Fig. 4. This handle consists in the main of three separable parts—a body portion 2, of channel form in section and with its sides tapering in converging relation from its outer end; a cover or lid 3 normally closing the open face of the channel; and a grip forming sleeve 4 to engage over the inner small end of the body portion and cover. Although the sides of the body portion converge, the cover and bottom of said body portion are parallel to each other.

The cover includes depending side flange 5 parallel to the sides of the body portion and engaging the same when the cover is in position, while the body portion at its outer end is provided with a fixed stiffening collar 6 thereabout.

The foldable or collapsible net unit which slides in and out of the handle from its outer large end, comprises a resilient frame, indicated generally at 7, and a flexible net 8 of conventional type connected to the frame along the length of the same.

The frame itself comprises opposed side strips 9 and a pair of outer end strips 10. The strips 9 are connected at their inner end by a hinge 11, which includes a removable hinge pin 12 of greater length than the body portion of the hinge, for the reason set forth later. The strips 10 are connected to each other at adjacent ends by a hinge 13, and at their opposite ends to the outer ends of the strips 9 by hinges 14. These hinges are disposed so that while the strips can freely fold inwardly so as to lie close to the side strips 9, they cannot be unfolded much beyond an alined or dead-center position relative to the hinges 14, as shown in Fig. 1.

Means are provided to normally prevent complete withdrawal of the net frame from the handle, while at the same time allowing of such withdrawal when it is necessary to repair the net or the handle itself. Such means comprises opposed and facing centrally disposed grooves 15 and 16 formed in outwardly pressed deformations 15a and 16a in the bottom of the body portion 2 and the lid 3, respectively, for the length thereof, and into which the ends of the relatively long hinge pin 12 project in guided relation.

Outward movement of the pin is limited by opposed stop blocks 17 and 18 secured in the outer end portions of the grooves 15 and 16, respectively. When the pin engages the stops, the frame strips 9 will engage the sides of the handle body at its outer end so that the end strips 10 of the frame when unfolded or swung out to their limit, cause the side strips 9 to be concavely bowed outwardly, as shown in Fig. 1, whereby the net frame is maintained in a rigid position. The frame is also held substantially rigid with the handle because of the pressure of the strips 9 against the sides of the handle, together with the centrally located, laterally immovable hinge pin.

To fold or collapse the net frame, it is only necessary to push in against the hinge 13, which allows the end strips 10, 10 to assume a position between the side strips 9 and the latter to straighten out, as indicated in dotted lines in Fig. 1. This of course relieves the holding pressure of the side strips 9 against the sides of the handle, enabling the net frame to be fully collapsed and slid into the handle; the net itself being thrown over into the frame from above before the latter is folded and slid into the handle. The length of the net frame side strips 9 is no longer than that of the handle, so that the frame can be fully received into said handle; the end strips being of course somewhat shorter than the side strips 9 so that when fully folded said end strips clear the hinge 11.

The strips 9, at their inner end, together with the hinge 11, extend the full height of the handle between the cover and bottom thereof, as shown at 19, so as to reduce play therebetween to a minimum. The major portion of the strips 9, as well as strips 10, however are relatively narrow, so as to leave storage space within the handle for the frame and its net. The taper form of the handle provides ample space for the net, while being small enough at its inner end for convenient grasping by a hand of the user. The net frame, when fully telescoped into the handle, extends to about the small end thereof so that it may be readily pushed out from said small end by a finger; exposing the other end of the frame a corresponding distance from the outer end of the handle for ready grasping and full withdrawal.

The cover 3 is removably held in place at its inner end by a grip sleeve 4, and at its outer end by a dowel pin 20 in, and projecting from, the block 18 and engageable in a hole 20a drilled in the collar 6, as shown in Figs. 3 and 6. The convergence of the side flanges of the cover prevents sliding of said cover along the handle in either direction when the grip sleeve 4 is in place.

The collar 6 is formed with a substantially O-shaped opening to receive the outer end of the body member 2, including deformation 15a, as well as the cover 3, including the side flanges 5 thereof, but not the deformation 16a thereof, which is cut back from the end of the cover, as shown in Figs. 3 and 5. The body member 2 is permanently secured in the collar, but the cover is slidably mounted in the collar and can be withdrawn therefrom.

Upon removal of the grip, which is of rubber so as to have a good frictional hold on the handle parts, the cover 3 may therefore be pulled back to withdraw the pin 20 from the collar 6, since said pin is fixed in the block 18, which is immovably mounted in said block. This exposes the hinge pin 12, so that said pin may be pulled clear of the hinge. This allows the hinge end of the net frame to be pulled through the collar 6 and withdrawn entirely from the handle, as indicated diagrammatically in Fig. 5.

A gaff is also mounted in connection with the handle without interfering with the net either in the open or telescoped positions of the latter. This gaff comprises a gaff hook 21 disposed outwardly of the inner end of the handle, and whose point—when the gaff is not in use—may be covered by a protector hood 22 connected to the grip 4 by a length of light chain 23 or the like.

A straight shank 24 projects from the gaff hook into the handle against one side thereof, the shank at its inner end being bent back, as at 25, to form a straight, elongated loop 26 with the adjacent portion of the shank; the loop element at its outer end being formed with a depending hook 27 to releasably engage over the shank 24. Such shank 24 is held against the side of the handle for limited sliding movement by a block 28 shorter than, and engaging, the opposed side loop forming elements of the loop so that the latter, and the shank, are slidably mounted in place. (See Fig. 3.)

When the loop is fully retracted within the handle, as determined by the engagement of the hook 27 with the block 28, only the hook projects from the handle, as shown in Figs. 1 and 2.

When it is desired to remove the gaff from association with the handle, it is only necessary to disengage the hook 27 from the shank, which allows the loop to be spread, as shown in Fig. 5, so as to disengage the same from the retaining block 28.

The block, being narrow and disposed against one side of the handle, offers no interference with the movement of the net frame into the handle, since the frame at its inner end is also narrow and is located centrally of the width of the handle.

The net frame, being relatively narrow for the major portion of its length, provides ample storage space for the net without danger of the latter being pinched between the handle faces and the adjacent edges of the frame members.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. A telescopic fish net unit comprising a tubular handle open at its outer end, a collapsible net supporting frame including side strips and a hinge connecting the strips together at their adjacent ends for folding and unfolding movement, said hinge including a relatively long hinge pin projecting from both ends of the hinge; the handle being provided with outward longitudinal deformations forming opposed longitudinal internal grooves, closed to the outside of the handle, in which the projecting ends of the pin ride in guided relation, means permanently mounted on the handle at its outer end and preventing movement of the pin outwardly from within the handle, the hinge pin being removable from the hinge; and means removably mounting one of said handle faces on the handle whereby to expose the hinge pin for withdrawal of the same from the hinge.

2. A unit, as in claim 1, in which said one handle face is in the form of a removable cover extending the full length of the handle, and said mounting means comprises a grip member removably engaged over the handle and cover at the inner end thereof, a collar secured on the handle at its outer end, and a pin projecting lengthwise from the cover at its outer end, the collar having a hole into which the pin removably projects.

3. A unit, as in claim 2, in which the sides of the handle and cover converge toward their inner end.

4. A collapsible telescopic fish net unit comprising a tubular handle open at its outer end, a net frame arranged to be folded so as to telescope into the handle from an outwardly projecting operative position, said frame including a pair of side strips, means hingedly connecting the strips together at their inner end for folding and unfolding movement, and means mounting the hinged end of the strips in the handle for movement, when folded, lengthwise in the handle and so that outward movement of the strips is limited to prevent such hinged end from reaching the outer end of the handle; said frame including elements, foldable relative to each other and to the side strips, extending between and connected to the strips at their outer end and arranged when unfolded and the side strips are extended to their limit, to cause said side strips to flare outwardly and to be placed under tension so as to then pressingly engage the interior wall of the handle at opposed points therein.

References Cited in the file of this patent

UNITED STATES PATENTS

| | | |
|---|---|---|
| 440,568 | Hebard | Nov. 11, 1890 |
| 2,556,650 | Hicks et al. | June 12, 1951 |
| 2,579,748 | Matthews | Dec. 25, 1951 |
| 2,653,404 | Phaneuf | Sept. 29, 1953 |

FOREIGN PATENTS

| | | |
|---|---|---|
| 468,880 | Canada | Oct. 24, 1950 |